(12) United States Patent
Favaretto

(10) Patent No.: US 11,220,169 B2
(45) Date of Patent: Jan. 11, 2022

(54) ELECTRIC OR HYBRID SPORT CAR

(71) Applicant: FERRARI S.p.A., Modena (IT)

(72) Inventor: Fabrizio Favaretto, Formigine (IT)

(73) Assignee: FERRARI S.P.A., Modena (IT)

( * ) Notice: Subject to any disclaimer, the term of this patent is extended or adjusted under 35 U.S.C. 154(b) by 72 days.

(21) Appl. No.: 16/722,928

(22) Filed: Dec. 20, 2019

(65) Prior Publication Data
US 2020/0207201 A1 Jul. 2, 2020

(30) Foreign Application Priority Data

Dec. 27, 2018 (IT) .................. 102018000021235

(51) Int. Cl.
| | |
|---|---|
| *B60K 1/00* | (2006.01) |
| *B60K 1/04* | (2019.01) |
| *B60L 50/64* | (2019.01) |
| *B60L 50/60* | (2019.01) |
| *H01M 50/20* | (2021.01) |

(52) U.S. Cl.
CPC ............ *B60K 1/04* (2013.01); *B60L 50/64* (2019.02); *B60L 50/66* (2019.02); *H01M 50/20* (2021.01); *B60K 2001/0416* (2013.01); *B60K 2001/0422* (2013.01); *H01M 2220/20* (2013.01)

(58) Field of Classification Search
CPC ........... B60K 1/04; B60L 50/66; B60L 50/64; H01M 50/20; H01M 50/24; H01M 10/6554
USPC ........................................................ 180/68.5
See application file for complete search history.

(56) References Cited

U.S. PATENT DOCUMENTS

| | | | |
|---|---|---|---|
| 8,336,658 B2* | 12/2012 | Rawlinson ........... | B62D 21/157 180/68.5 |
| 8,835,033 B2* | 9/2014 | Choi ..................... | H01M 50/24 429/100 |
| 9,533,600 B1* | 1/2017 | Schwab ............ | H01M 10/6554 |
| 2009/0236162 A1* | 9/2009 | Takasaki ............... | H01M 50/20 180/68.5 |
| 2011/0297469 A1* | 12/2011 | Usami ...................... | B60K 1/04 180/68.5 |
| 2012/0097466 A1* | 4/2012 | Usami ...................... | B60K 1/04 180/68.5 |
| 2012/0103714 A1* | 5/2012 | Choi ..................... | H01M 50/20 180/68.5 |
| 2012/0161429 A1 | 6/2012 | Rawlinson et al. | |
| 2013/0126254 A1* | 5/2013 | Lee ......................... | B60L 50/66 180/68.5 |
| 2014/0182958 A1* | 7/2014 | Rawlinson ........... | B62D 21/157 180/68.5 |

FOREIGN PATENT DOCUMENTS

| | | |
|---|---|---|
| DE | 102015213860 A1 | 1/2017 |
| FR | 2972169 A1 | 7/2012 |

OTHER PUBLICATIONS

Search Report issued in Italian Application No. 201800021235, completed Oct. 29, 2019; 8 pages.

* cited by examiner

*Primary Examiner* — Hau V Phan
(74) *Attorney, Agent, or Firm* — Cantor Colburn LLP

(57) ABSTRACT

An electric or hybrid sport car comprising a battery pack incorporating at least one structural element of the vehicle frame, and wherein said structural element can be removed from the vehicle frame only together with the battery pack.

8 Claims, 14 Drawing Sheets

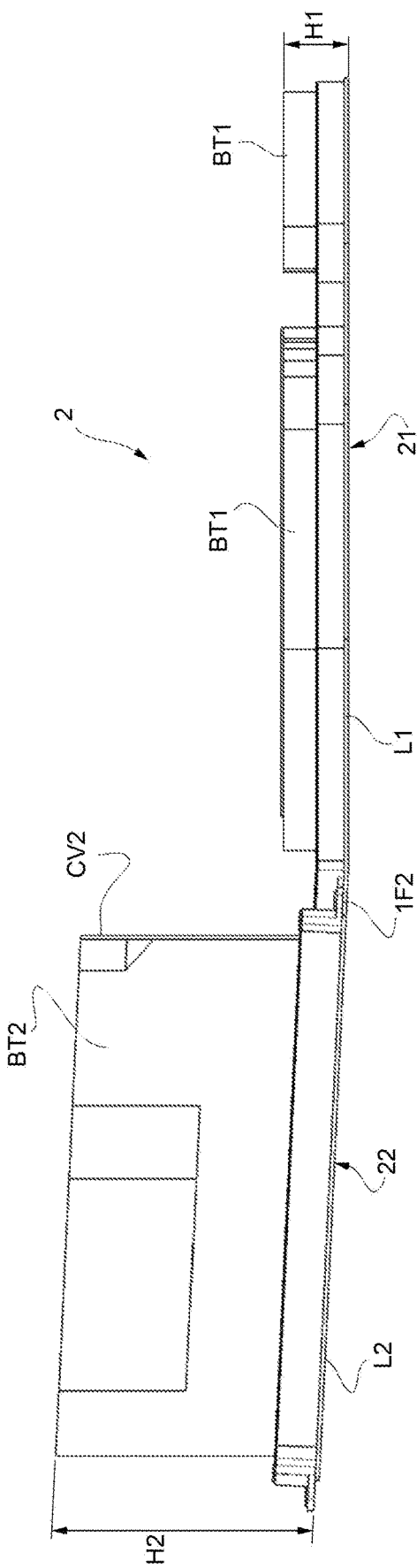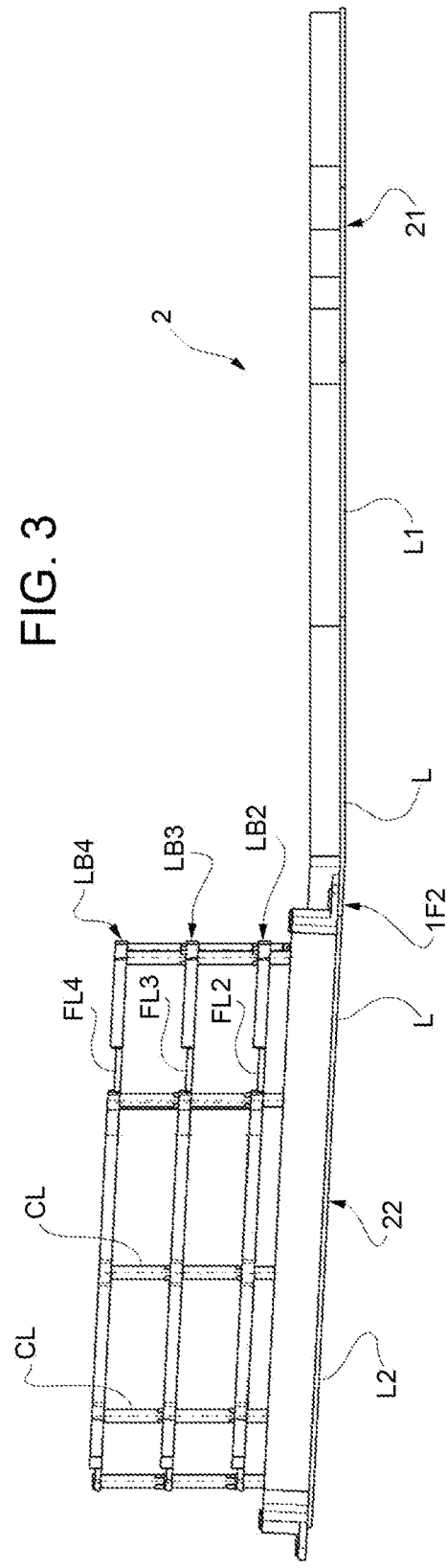

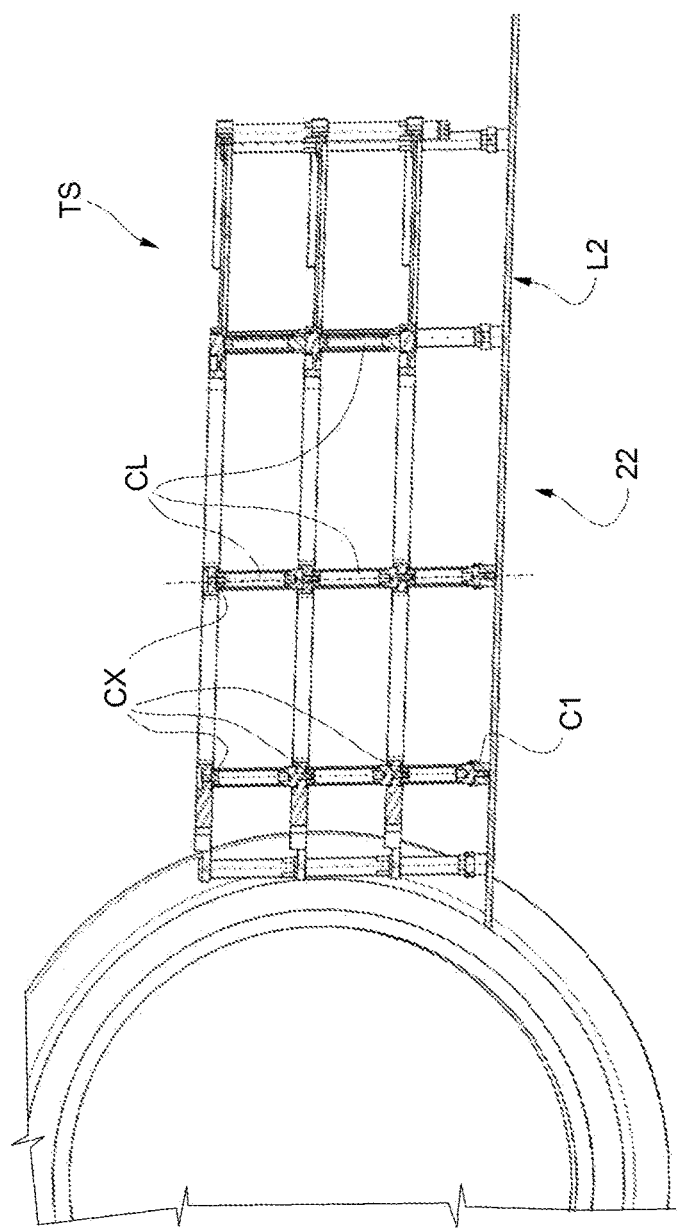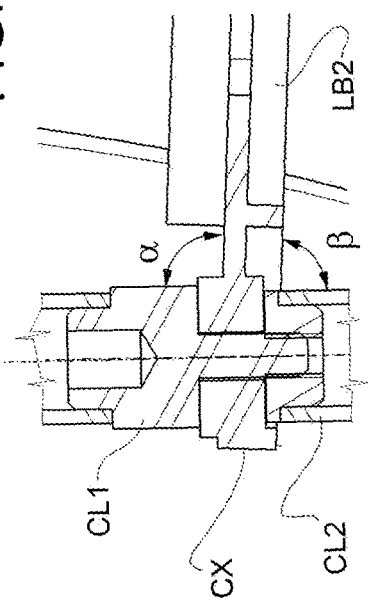

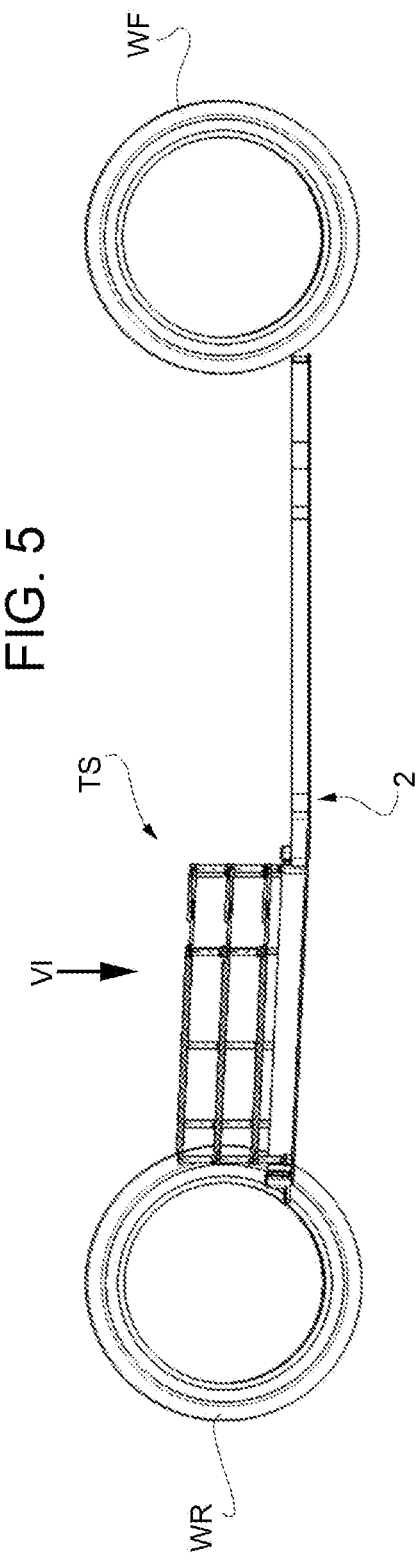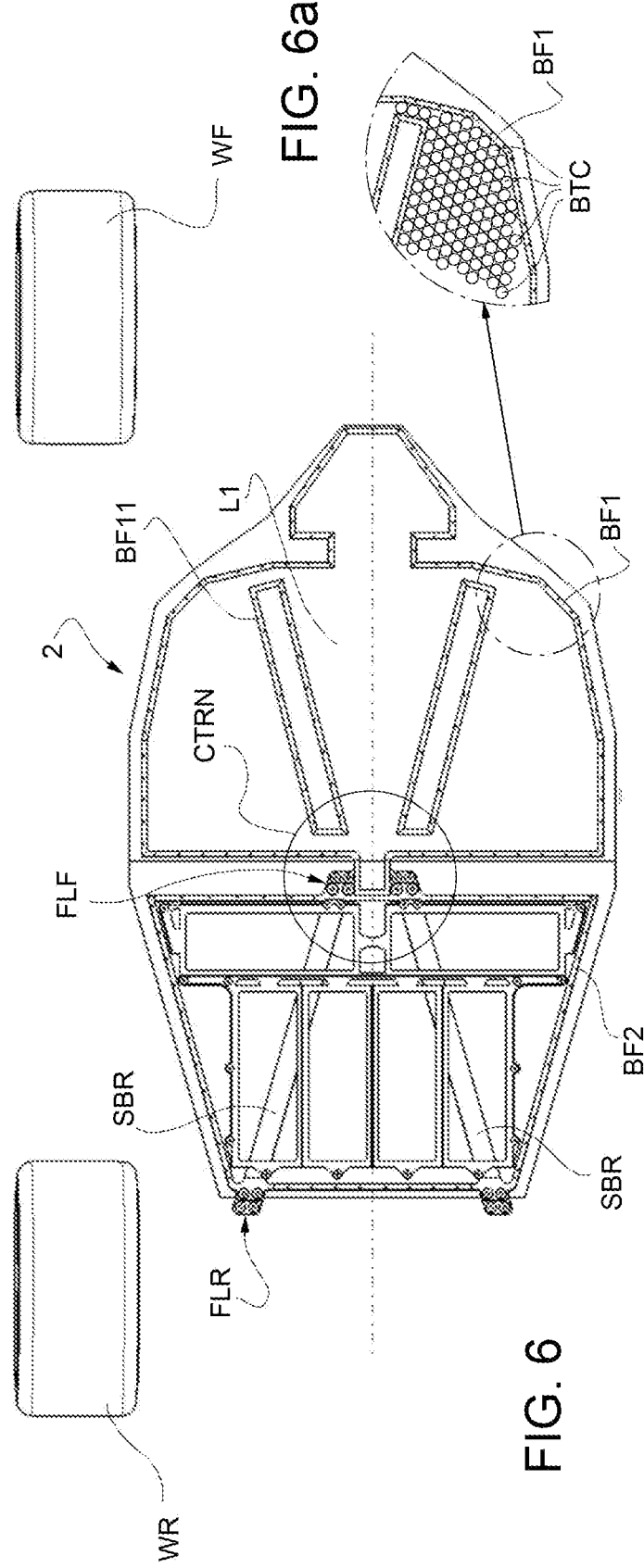

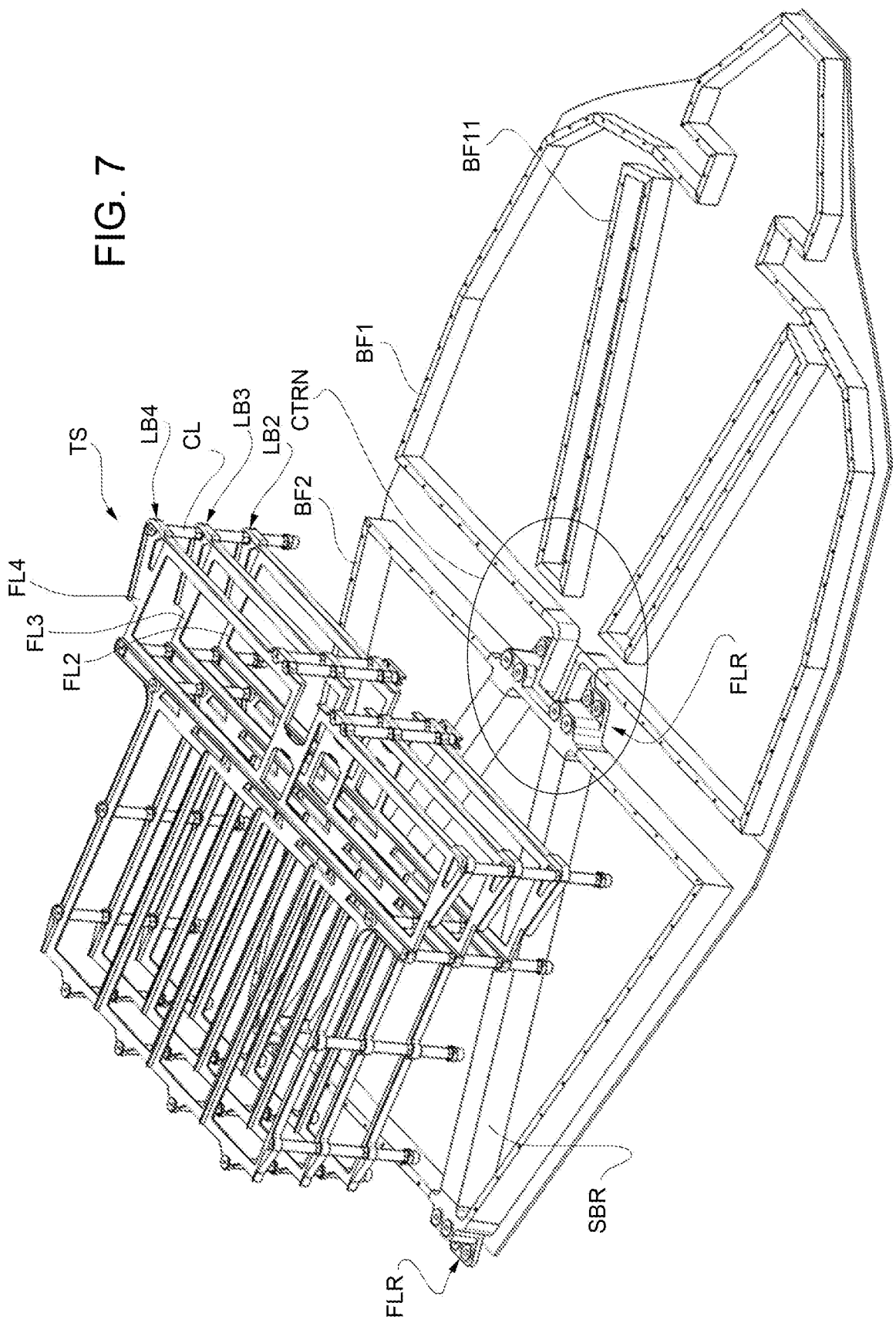

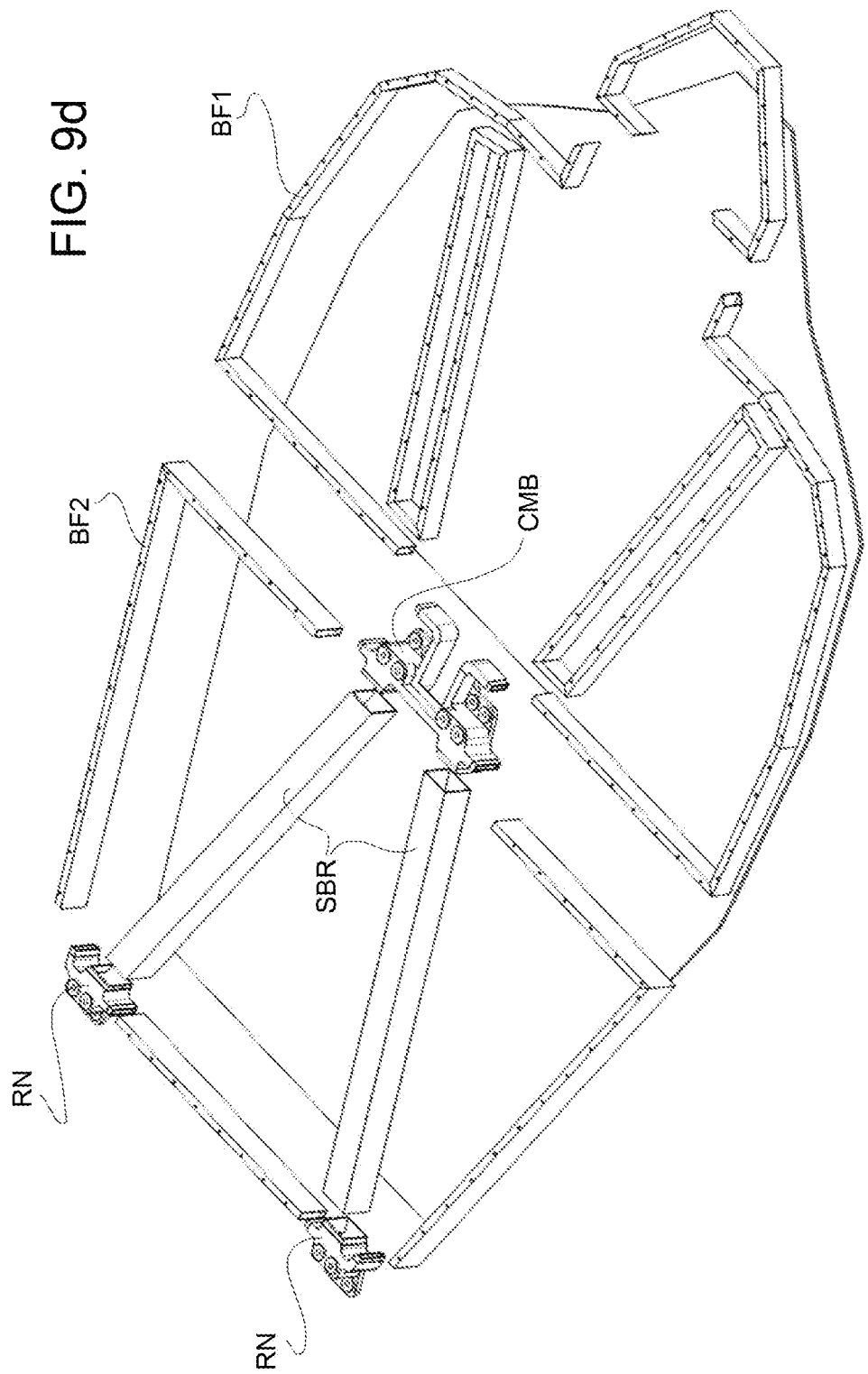

ELECTRIC OR HYBRID SPORT CAR

CROSS-REFERENCE TO RELATED APPLICATIONS

This patent application claims priority from Italian patent application no. 102018000021235 filed on Dec. 27, 2018, the entire disclosure of which is incorporated herein by reference.

TECHNICAL FIELD OF THE INVENTION

The invention relates to an electric or hybrid sports car and, in particular, to the system used to mount a vehicle battery pack.

STATE OF THE ART

The most commonly used batteries are cylindrical batteries, prismatic batteries and pouch batteries. They must be grouped together, electrically connected to one another and associated with the vehicle in a stable manner.

The batteries are generally anchored to the floor of the vehicle. In some cases, the batteries are housed in the floor itself; in other cases, they are arranged in the place normally occupied by the traditional heat engine assembly.

Sports cars, which need to deliver very high performances, are required to have a conformation of the lower part of the vehicle frame that is such as to fulfil predetermined mechanical requirements.

Therefore, it is very hard to ensure both the fulfillment of rigidity requirements and a suitable protection of the batteries installed under the vehicle.

Document DE102015213860 describes a set of batteries in an electric drive vehicle comprising a driving battery, which is inserted in a main battery compartment, which is separate from a battery compartment arranged in a central tunnel integrated in the base of the vehicle.

Document FR2972169 describes a modular frame for vehicles comprising a central module, which forms a base platform comprising at least a front cross member and a rear cross member, which are connected to one another.

Document US2012161429 describes a vehicle in which the seats are mechanically coupled to the cross members of the battery pack contained inside a housing of the battery pack mounted under the vehicle.

Document US2011297469 describes a battery placed under the front base of a vehicle. The modules of this battery are arranged in a longitudinal direction.

If not specifically excluded by the detailed description below, the information contained in this part should be considered as an integral part of the detailed description itself.

SUMMARY OF THE INVENTION

The object of the invention is to provide an electric or hybrid sports car provided with a particularly rigid and sturdy frame, which, at the same time, has housing abilities.

The idea on which the invention is based is that of providing a battery pack incorporating at least one structural element of the vehicle frame, said structural element being removable with the battery pack.

Preferably, said structural element is enclosed in a sandwich-like manner between a frame supporting one or more battery modules and a platform that helps to define a base of the car.

Preferably, said battery pack incorporates a pair of side members of the frame designed to define a portion of the frame which is integrated in the floor of the car.

According to a preferred aspect of the invention, the floor consists of a fixed portion with the frame comprising a front beam and a central beam and comprises a base removable together with said battery pack, in which said side members are housed, which are arranged in an oblique manner and behind said central beam and, therefore, are defined as rear oblique side members. Under operating conditions, they cooperate with the remaining frame of the car, forming an integral part thereof. Said rear oblique side members converge in a central portion of the central beam and diverge at the back, thus causing the rear portion of the floor to be a set of structural triangles, which are complementary to one another.

The dependent claims describe preferred embodiments of the invention, thus forming an integral part of the description.

BRIEF DESCRIPTION OF THE FIGURES

Further objects and advantages of the invention will be best understood upon perusal of the following detailed description of an embodiment thereof (and of relative variants) with reference to the accompanying drawings merely showing non-limiting examples, wherein:

FIGS. 2 and 3 show side views of the floor of FIG. 1, wherein FIG. 2 shows covers of the battery packs, whereas FIG. 3 shows a support frame for a battery pack consisting of different layers, housed behind the seats of the cabin of the car;

FIG. 4 shows a detail of the support frame of FIG. 3 with reference to a rear wheel of the vehicle and FIGS. 4a and 4b show constructive details of the support frame;

FIGS. 5 and 6 show a side view and a view from the top, respectively, of the floor of FIG. 3;

FIG. 6a shows a detail of FIG. 6 in which cylindrical chemical batteries are housed, so as to obtain the maximum filling of the space available in the floor of the car;

FIG. 7 shows an exploded view according to a perspective view of an exploded view of the floor of FIG. 3;

FIGS. 9a-9c show manufacturing details of the floor according to the preceding figures and FIG. 9d shows an exploded view of a portion of the floor according to the preceding figures;

FIG. 11 shows a perspective view from the top of the car in the condition of FIG. 10, whereas

In the figures, the same numbers and the same reference letters indicate the same elements or components.

For the purposes of the invention, the term "second" component does not imply the presence of a "first" component. As a matter of fact, these terms are only used as labels to improve clarity and should not be interpreted in a limiting manner.

The elements and features contained in the different preferred embodiments, drawings included, can be combined with one another, without for this reason going beyond the scope of protection of this patent application, as described hereinafter.

DETAILED DESCRIPTION OF EMBODIMENTS

Figure 1:
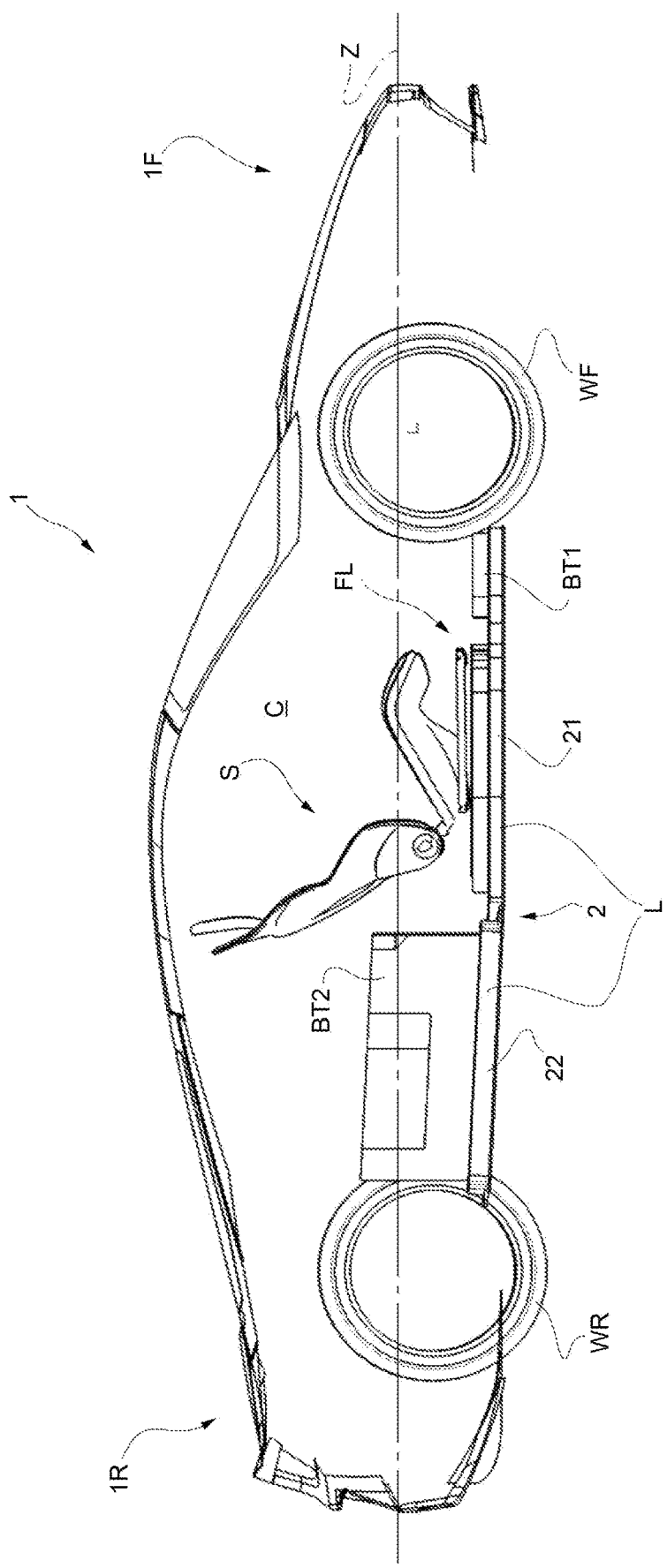
FIG. 1 shows a side view of a sports motor vehicle with transparent portions of the body, highlighting a floor in which and/or to which battery packs are anchored.

FIG. 1 shows an electric or hybrid car 1 in a side view and with transparent parts. The front part 1F of the car is arranged on the right side of the sheet, opposite the rear part 1R, according to the longitudinal development Z of the car.

Therefore, the front wheels WF of the front axle and the rear wheels WR of the rear axle can be identified. The floor FL of the car approximately extends between the front axle and the rear axle.

The floor comprises a removable base 2 and a fixed portion, which is an integral part of the frame of the car. Hereinafter, in order not to generate confusion, by base 2 we mean the removable portion of the floor and by "floor of the frame" we mean the fixed portion of the floor which cannot be removed from the floor.

The base 2 comprises a front part 21 and a rear part 22.

The front part 21 supports, on top, the seats S accommodating the occupants of the car.

The base 2 of the car 1 houses electric batteries (which are not shown herein).

FIGS. 2 and 3 show, in detail, the base 2 of the car removed from the remaining body of the car.

The rear part 22 of the base support a rear battery pack BT2 having a height which is significantly greater than the height or thickness H of the battery pack BT1 integrated in the front part 21 of the base 2. This is due to the fact that the front part of the base is under the cabin C, where the vital space of the occupants of the vehicle is obtained and where the relative seats S are housed.

Even though the appended figures do not show any heat engine, it can be housed in the front part of the car or behind the rear battery pack BT2, thus defining a configuration in which the rear battery pack is interposed between the heat engine and the seats of the car.

The rear part 22 of the base, on the other hand, can project upwards. This leads to the creation of different structural support scaffoldings LB1, LB2 and LB3 supporting the same number of layers of electric batteries (which are not shown).

The lower part of the base consists of a so-called platform L, which consists of a plate made of metal or of a high-resistance composite material. The platform is exposed to the outside and faces the ground on which the car lies.

Preferably, the platform L of the car is not flat. The front part L1 is substantially flat. The rear part L2 is substantially flat, but in the area of interface 1F2 between the two parts L1 and L2 there is a corner, which is also indicated with symbol 1F2 and extends crosswise to the longitudinal development Z.

The fact that there is a smaller or greater corner is evidently irrelevant for the purposes of the description.

The interface faces the ground and can be more or less rounded. Therefore, the platform progressively gets farther from the ground moving from the interface 1F2 towards the rear part 1R of the vehicle. This fact improves the aerodynamic load of the car.

The angle formed between the front portion L1 and the rear portion L2 of the platform preferably ranges from 1 to 5 degrees and is preferably equal to 3 degrees.

The different structural layers LB2, LB3, etc. are all parallel to the rear portion L2 of the platform L. Therefore, the rear portion L2 of the platform L defines a first structural layer supporting some electric batteries.

According to a preferred aspect of the invention, the structural columns CL are vertical when the vehicle is in running order. This implies that a non-perpendicular angle is formed between the structural columns CL and the rear part L2 of the platform L.

This turns out to be very advantageous in use, since the columns can have been designed to work in a vertical position and, therefore, they keep doing so even when they are associated with a platform that is not horizontal, such as the rear portion L2 of the platform L.

During the assembly of the base 2, the platform L is placed on a complementary jig, which supports it keeping it oriented in the space in the same operating conditions of when it is operatively associated with the frame of the vehicle. Advantageously, the columns must be mounted with a vertical orientation V, with indisputable advantages during the assembly thereof and, in general, of the support frame TS of the batteries.

FIG. 4 shows in detail the support frame TS defining the rear battery pack BT2.

It comprises base fixing elements C1 having an almost cylindrical shape. They are rotation solids having an upper base, which is perpendicular to the rotation axis, and a lower base, which forms an angle with the rotation axis that is almost perpendicular. In other words, the lower base of the base fixing elements C1 makes up for a non-horizontal arrangement of the rear portion L2 of the platform L.

If said portion forms a 3 degree angle relative to the first portion L1 of the platform L, then the lower base is perpendicular to its rotation axis at less than 3 degrees, which means that it forms a 93 degree angle and an 87 degree angle corresponding to the alpha and beta angles shown in FIG. 4b.

The columns CL are fitted on the fixing elements C1.

The different layers LB2, LB3, etc. preferably consist of plates FL2, FL3, FL4 of metal material where suitable machining operations are carried out or, through founding, suitable seats CX are obtained, where the opposite ends CL1 and CL2 of the columns CL are inserted. Said seats are designed so that the layers LB2, LB3, etc. are parallel to the rear portion L2 of the platform L, optimizing a distribution of the forces and a better heat exchange.

Therefore, different support layers LB2, LB3 are obtained, which have the columns CL operatively in a vertical position, whereas the different scaffoldings FL2, FL3 are transverse elements, which are always parallel to the rear portion L2 of the platform.

In other words, each column has a first male end CL1 and a second female end CL2 opposite the first end.

With reference to FIG. 4b, the male end of a column is inserted, for example by means of a threaded coupling, into the female end of another column or, with reference to FIG. 4a, into the base fixing element C1.

When the male end of a column is inserted into the female end of another column, it clamps, in a sandwich-like configuration, a plate PL2, PL3, etc., thus defining one single body which includes two columns and a plate.

The plate has seats CX having opposite horizontal faces, namely faces that form an angle of +3 and −3 degrees, respectively, relative to the plane of the plate.

In other words, the supplementary alpha and beta angles differ, in absolute value, by twice the inclination of the rear part of the platform relative to a horizontal plane.

The columns have an oblong shape, preferably a cylindrical shape. Therefore, the ends CL1 and CL2, thanks to the seats CX, have an ideal peripheral adhesion to the seats, thus avoiding the formation of hinge nodes.

Thanks to this technical solution, a large contact surface is defined between the vertical columns and the seats CX, thus allowing for a particularly rigid support frame TS, besides optimizing heat exchanges among the different layers of batteries, the columns CL and the rear part L2 of the platform.

According to a preferred variant of the invention, the columns CL are obtained from an extruded tubular—preferably cylindrical—section bar, at whose opposite ends there are inserted a male plug and a female plug, which substantially coincide with the aforesaid opposite ends CL1 and CL2 of a column CL.

FIG. 5 shows the base 2 of the electric or hybrid car according to the invention in relation to the front axle WF and the rear axle WR. FIG. 6 shows a view from the top II of the assembly shown in FIG. 5.

For an easier understanding of the parts, the layers LB2, LB3, etc. are represented in a transparent manner. Alternatively, when the batteries consist of autonomous modules with relative casings, the layers LB2, LB3, etc. can be peripheral frames rather than plates, with an overall lightening of the support frame TS.

The figures show protection frames BF1 and BF2, namely a front and a rear protection frame, respectively, which are associated with the upper face of the front portion L1 and of the rear portion L2 of the platform L, respectively.

This frames peripherally surround the base 2. They are preferably obtained from a box-shaped element with a rectangular cross section, which is properly shaped in order to follow the perimeter of the front portion and of the rear portion of the platform L.

The rear portion L2 houses two oblique side members SBR, which, from the rear part of the vehicle, converge towards a central portion CTRN, which, according to the description below, is a central node where different structural elements of the vehicle frame converge.

The term "oblique" is clear when taking into account a longitudinal development axis Z of the car.

All the side members described herein preferably have a longitudinal shape preferably obtained by means of a tubular element with a square or rectangular cross section and made of a high-resistance material.

Unlike the other structural elements converging in the central node CTRN, which are described below, the oblique side members SBR are manufactured as one single piece together with the base 2.

In other words, the base 2 basically comprises the platform L (L1, L2), on whose upper surface the protection frames BF1 and BF2 are applied, the oblique side members SBR and the battery support frame TS, according to the exploded view of FIG. 7. The base 2 also comprises, in order to be complete, proper covers described below.

Figure 10:
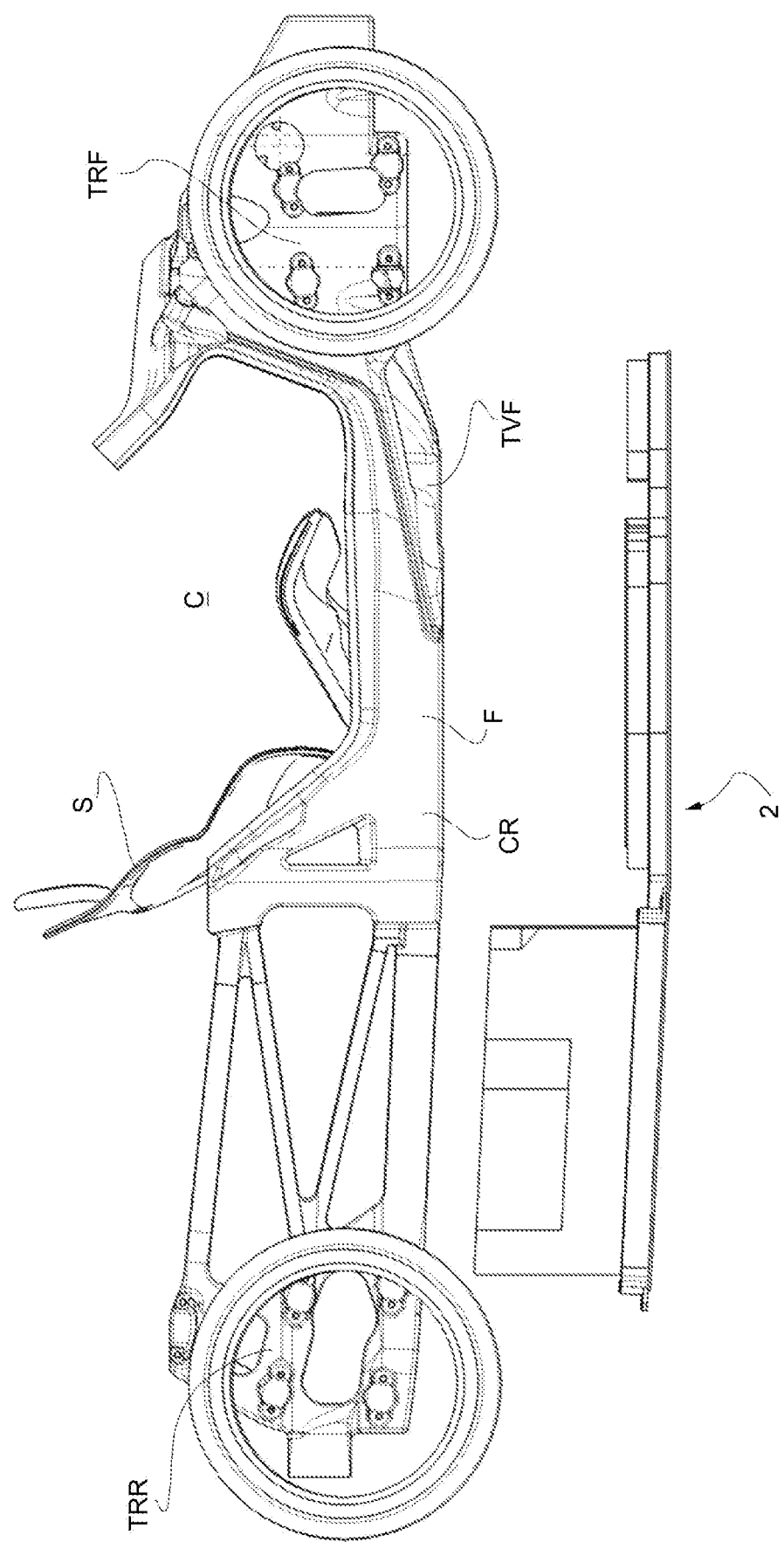
FIG. 10 shows a side view of the car of the preceding figures with specific reference to the relative frame, during an insertion or an extraction of a relative floor.

Therefore, when the base 2 is associated with the remaining frame F of the vehicle, from underneath, according to FIG. 10, the rear oblique side members are selectively connected to the remaining frame by means of suitable flanges. In particular, there are rear flanges FLR and front flanges FLF.

The different oblique side members, both the front ones and the rear ones, are preferably obtained from box-shaped elements with a rectangular cross section.

The rear flanges are going to be fixed close to a particularly rigid portion of the frame commonly known as "rear tower", namely a rear tower TRR to which a rear suspension (not shown) is fixed.

The towers usually are sturdy metal components extending vertically, which is why they are called towers.

The front flanges, on the other hand, are going to be fixed to the aforesaid central node.

The frames BF1 and BF2 preferably converge in said central node as well, thus increasing the stiffening of the structure.

FIGS. 6 and 7 also show inner frames BF11 associated with the front part L1 of the platform L. These frames are used to surround, when the base is applied to the car, front oblique side members SBF, which, unlike the rear ones SBR, are manufactured as one single piece together with the frame F of the vehicle.

FIG. 6 shows, in plan view, the platform with the relative frames. FIG. 6a shows a portion of FIG. 6 representing the cylindrical batteries BTC. These batteries are arranged so that a relative symmetry axis is perpendicular to the platform, namely to a plane on which the floor of the car lies.

Support elements are provided, though not shown, which, for example are made of a plastic material, which occupy the entire volume defined by the intersection of the structural elements, such as side members and beams, which, by intersecting one another, help define one of the triangular structures inserted in the floor of the car.

The cylindrical shape of the single cells is particularly advantageous to occupy all the space available.

Figure 8:
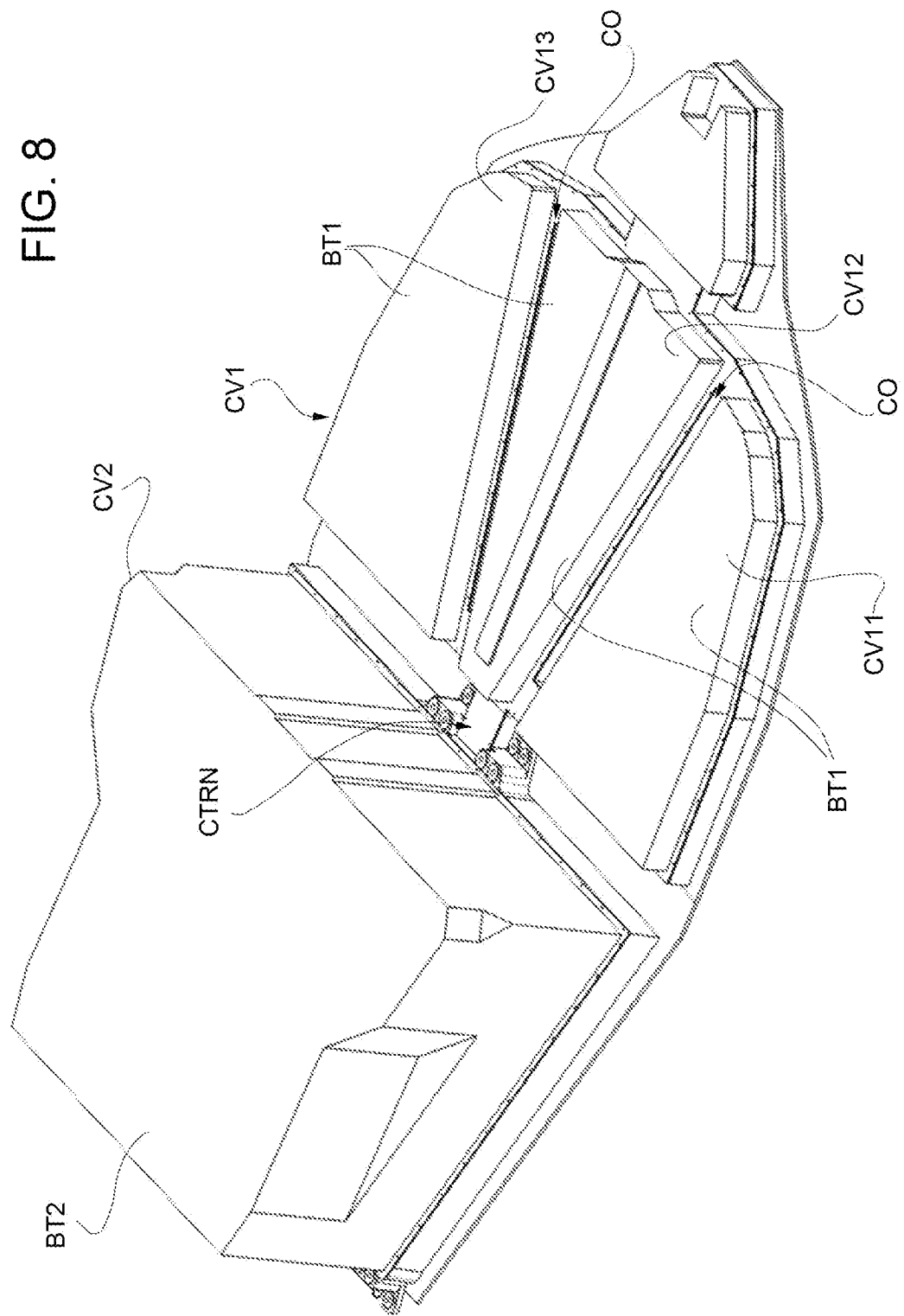
FIG. 8 shows a perspective view of the floor provided with covers of the battery packs as shown in FIG. 2.

This perfect complementarity is evident from FIG. 8.

Document EP3264497A1 shows a support and electric connection system for a plurality of cylindrical batteries packed together by means of two half-shells, which cover the upper end and the lower end, respectively, of the plurality of cylindrical cells.

These half-shells are preferably shaped so as to be perfectly framed in the frames BF1, so as to fill the entire space available, as shown, in particular, in FIG. 6a.

The fact that the batteries housed in the floor are cylindrical does not imply that the rear battery pack BT2 also consists of cylindrical batteries. Indeed, according to FIG. 7, the volume occupied by the rear battery pack is more regular and, therefore, the battery modules can have the shape of a parallelepiped and, furthermore, all types of cells, namely cylindrical, prismatic or pouch cells, can be adopted. This is particularly advantageous when two battery packs with different capacities and a different C-rate are needed, wherein the C-rate is given by the ratio between the deliverable power and the storage capacity of each cell.

Figure 11:
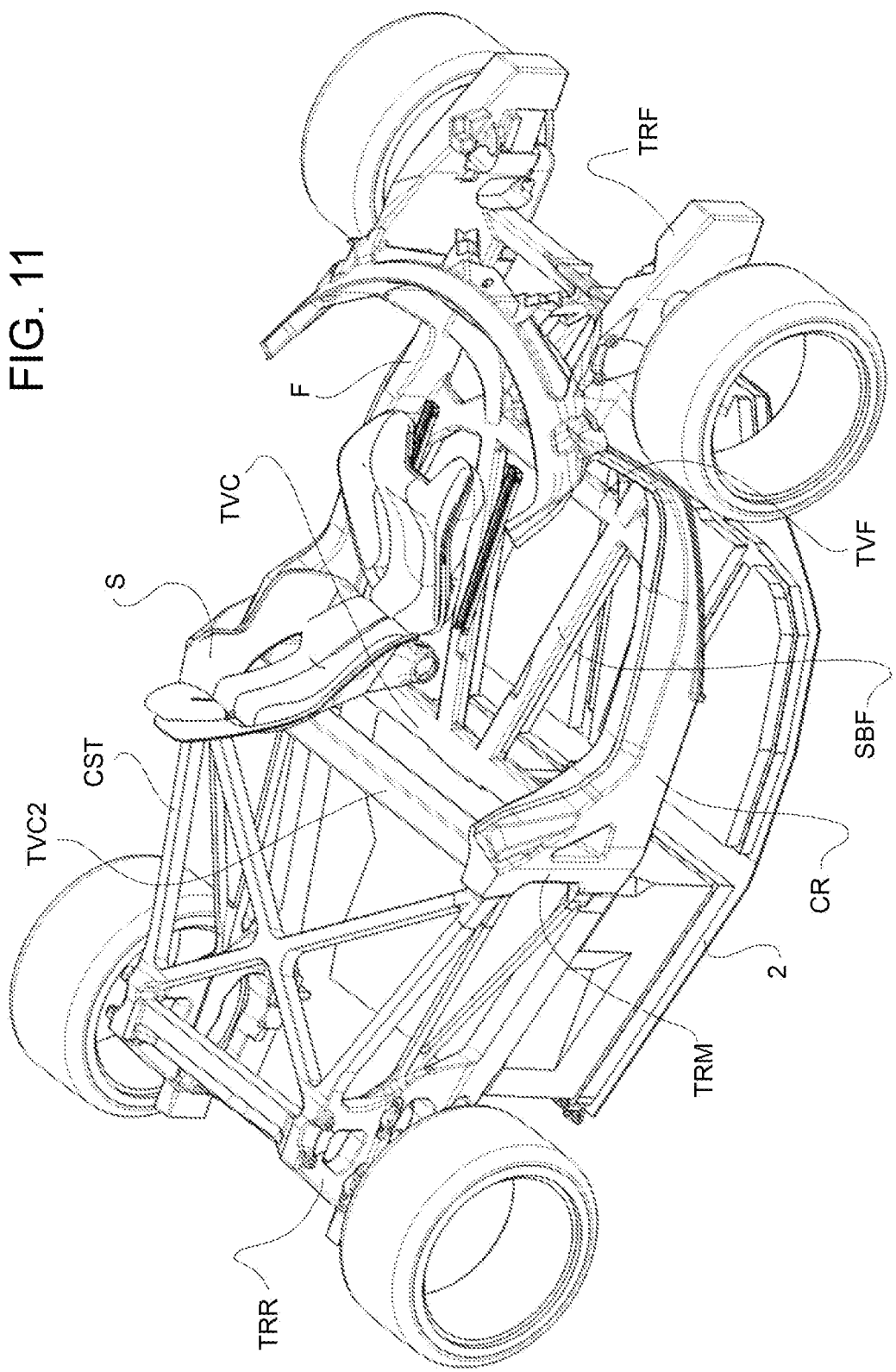

To this regard, FIG. 11 shows the frame F of the vehicle with the base exploded underneath and the front oblique side members SBF.

FIG. 8 shows, according to the same angle as FIG. 7, the complete base 2.

The rear battery pack BT2 is covered by a cover made of a proper material, which encloses, on the inside, the entire battery pack BT2, striking against the rear protection frame BF2.

The front battery pack substantially consists of three portions, a central portion and two lateral portions, enclosed inside respective covers CV11, CV12 and CV13.

In this case, again, the three covers of the front battery pack strike against the front protection frame BF1 peripherally surrounding the front part of the platform. Therefore, two oblique longitudinal grooves CO are defined, which converge from the front part of the vehicle towards the aforesaid central node CTRN.

A further longitudinal groove is defined between the front battery pack BT1 and the rear battery pack.

These grooves are complementary to elements of the frame, among which there are the front oblique side members SBF visible in FIG. 11.

Figure 9A:
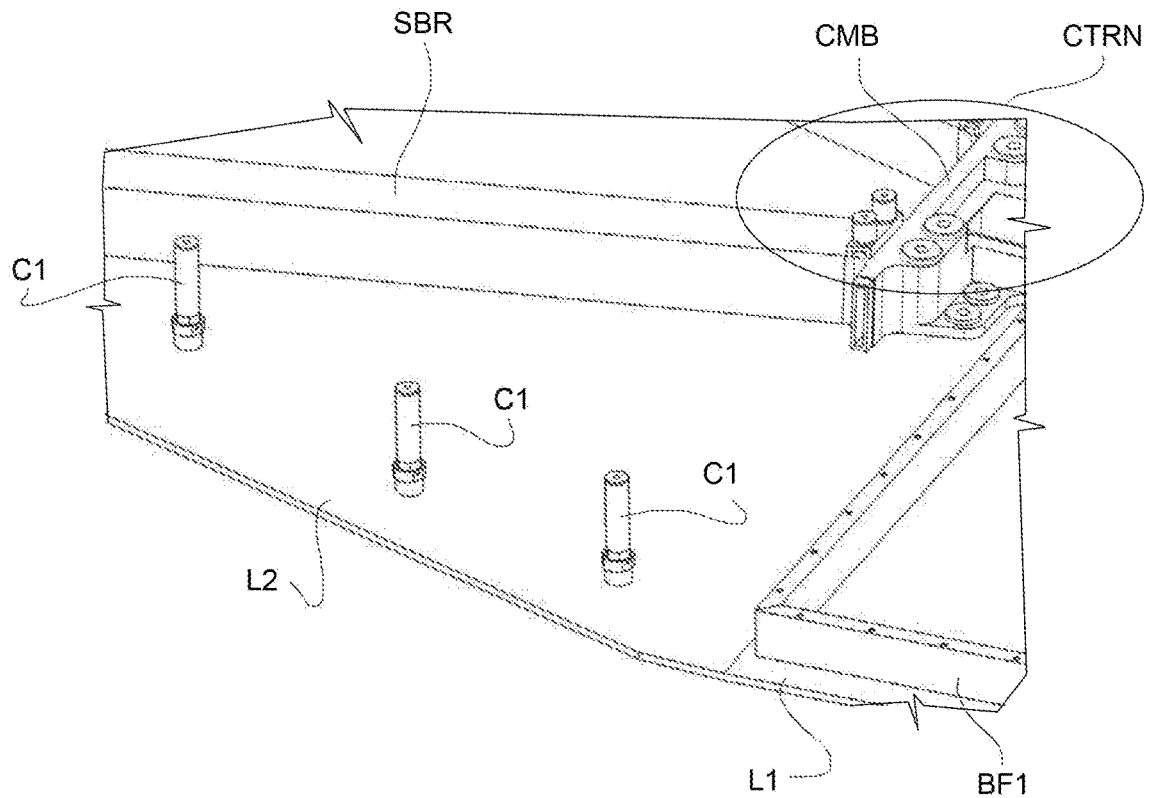

FIG. 9a shows a portion of the base 2 highlighting the rear portion L2 and the front portion L1 of the platform L.

The rear frame BF2 is not shown for a better understanding of the drawing. This figure shows that the central node at least partially consists of a central connection element CMB, which is directly connected to the rear oblique side members SBR, to the rear portion L2 and to the front portion L1 of the platform L; the front protection frame BF1 and the rear protection frame BF2 also converge towards said element.

Figure 9B:
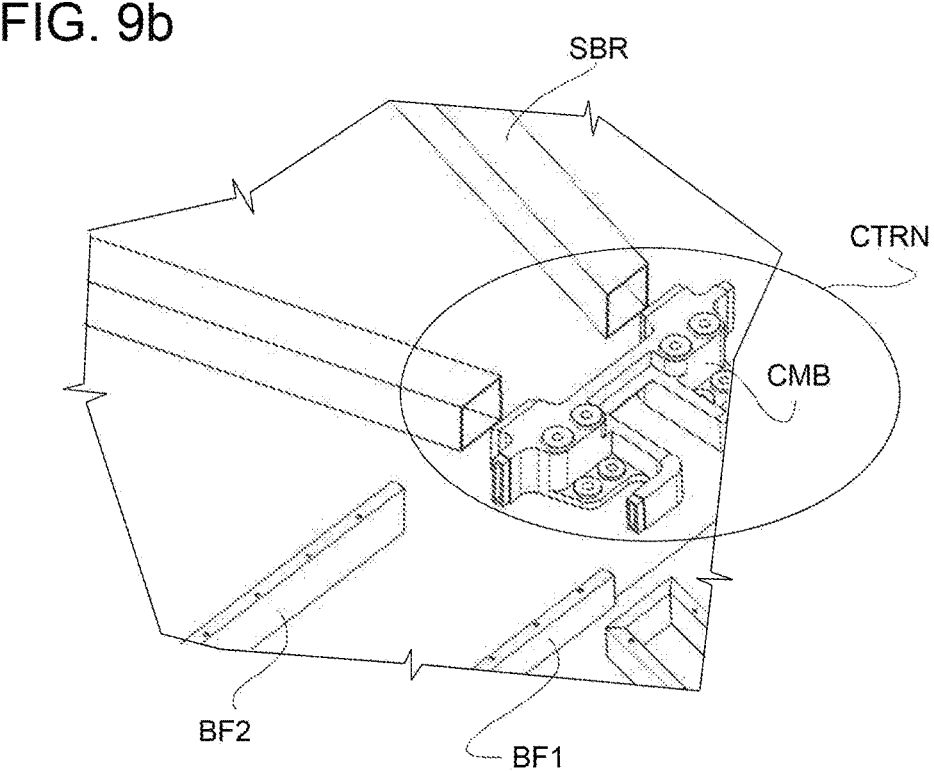

FIG. 9b shows an exploded view of the central area of the base 2.

It shows how the central connection element CMB acts like a flange connecting the base 2 to the remaining frame F of the motor vehicle, for example by means of bolts and screws. From the top, it is substantially shaped like a pi, with the rear oblique side members SBR and the rear protection frame BF2 converging towards the upper part, whereas the front protection frame BF1 is connected to the legs of the pi.

Figure 9C:
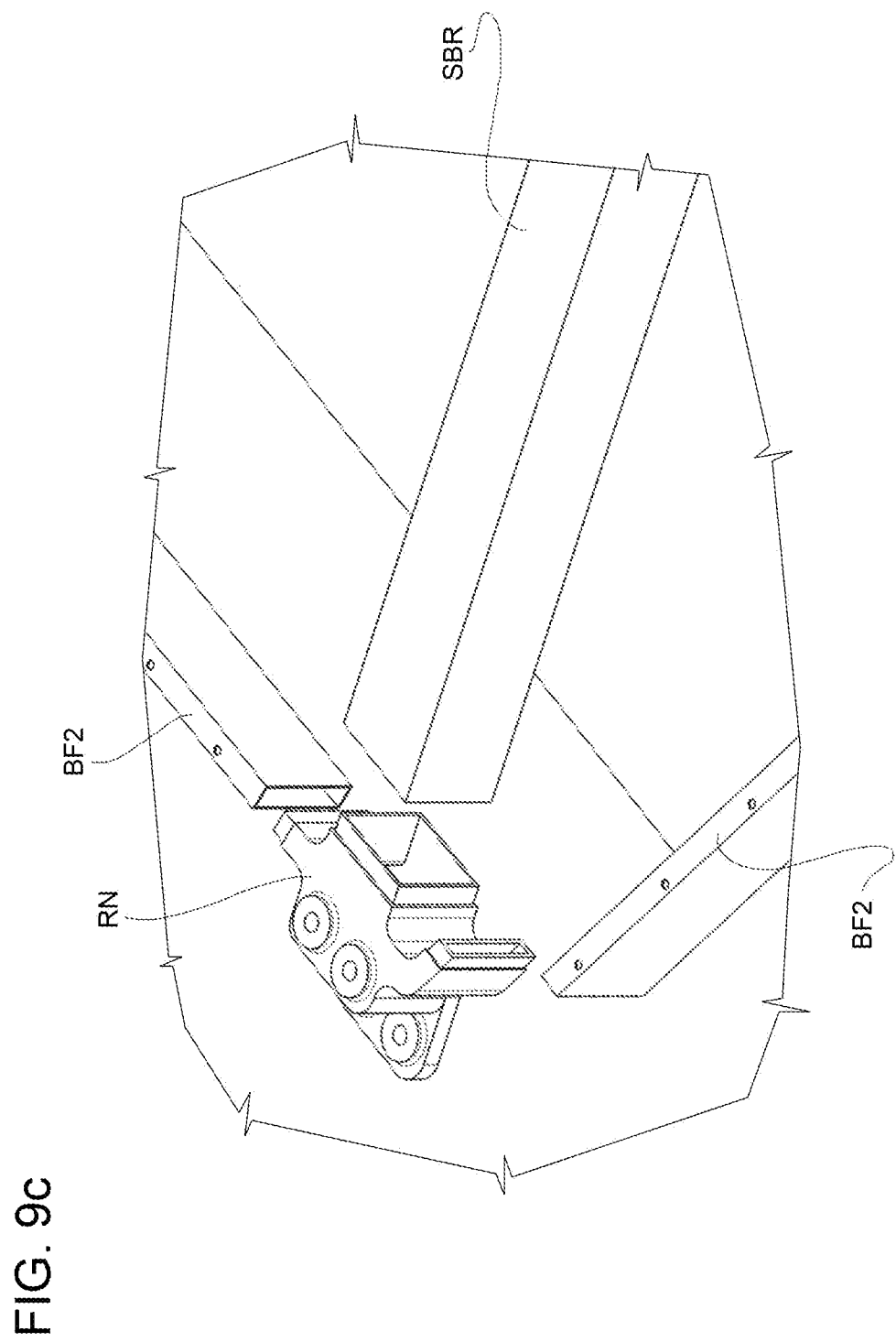

FIG. 9c shows details of exploded portions of the base 2. Two connection elements RN, which are similar to the central element CMB, are provided also for the rear holding, but they are arranged in the area of the rear ends of the rear oblique side members. In this case, the rear connection elements RN are going to be assembled with the rear protection frame BF2, the rear oblique side members and the rear portion of the platform L2.

Just like the central connection element CMB, they define flanges for fixing the base to the remaining frame through bolts.

Figure 14:
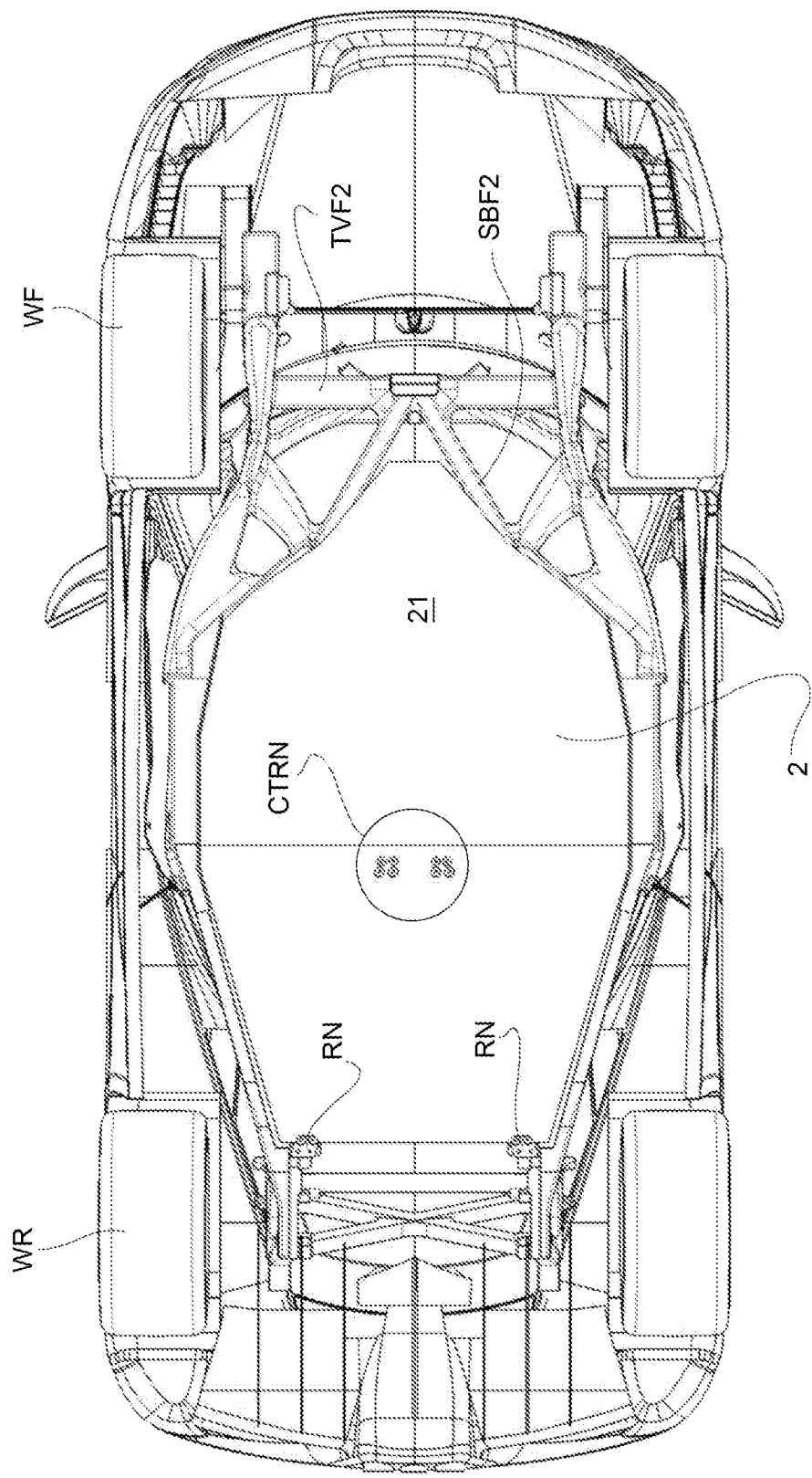

It is clear that the edges of the base 2 are going to be connected to the remaining frame by means of suitable screws, but it is also clear that the rear oblique side members SBR, since they have to interact with the frame, as they are part of it, when the base 2 is associated with the remaining frame, require large-sized screws and bolts, as you can see in the view from the bottom of the vehicle of FIG. 14.

FIG. 9d shows an exploded assembly of the base 2, where the support frame TS is not shown, so as to better understand the multitude of joints created between the elements defining the protection frame and the mounting elements CMB and RN as well as between the latter and the rear oblique side members.

Figure 12:
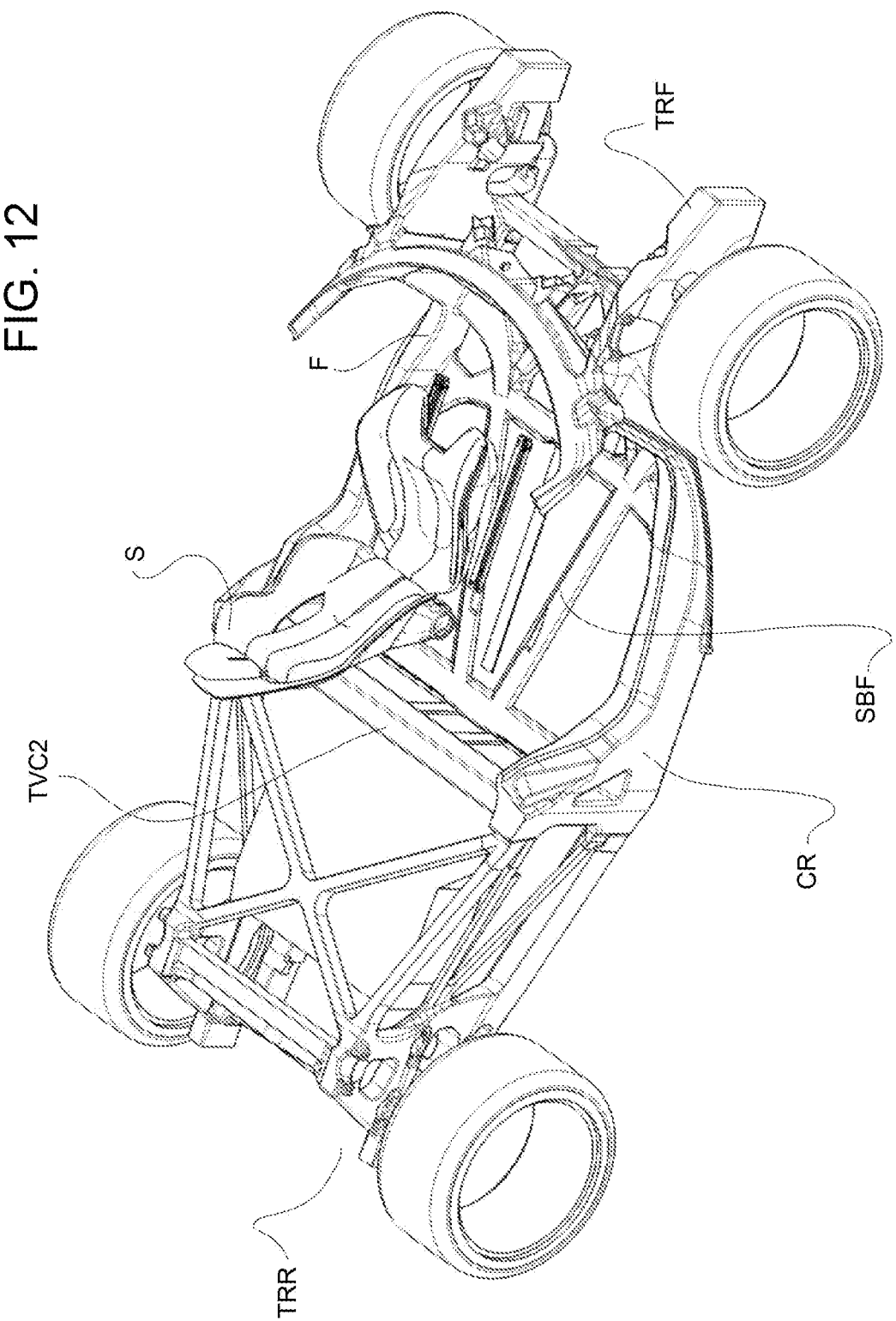
FIG. 12 shows the same perspective as FIG. 11, wherein the floor is associated with the frame of the car.

With reference to FIGS. 10-12, the frame F of the car according to the invention is described with particular reference to the floor of the frame. As already mentioned above, it consists of a fixed portion of the frame, which cannot be removed. It comprises a cradle CR, which laterally surrounds the floor FL of the cabin C and comprises a front beam TVF, which extends from one side to the other of the vehicle between the driver's seat and the control pedals of the vehicle, and a central beam TVC, which extends from one side to the other of the vehicle and is arranged immediately behind or under the seat S.

Said front and central beams intersect the cradle CR at their opposite ends.

The central beam is particularly useful to brilliantly pass crash tests, in particular the pole impact test.

In the area delimited by the cradle CR and by the beams TVF and TFC there is a pair of front oblique side members SBF, which converge towards a central area of the central beam TFC.

Therefore, the frame portion obtained in the floor comprises a set of structural triangles.

As disclosed above, the base 2, which represents a removable portion of the floor FL, includes a pair of rear oblique side members SBR, which are entirely integrated in the base and, hence, can be removed with it.

Said rear oblique side members SBR, once associated with the remaining frame F, make the frame portion integrated in the floor FL of the vehicle a planar set of triangular structures. As it is known, triangular structures are the most rigid and stable ones existing in nature. As a consequence, the floor is as rigid and stable as possible.

According to the figures, the central beam TVC preferably represents a symmetry axis for the front oblique side members relative to the rear ones.

Therefore, the entire frame portion integrated in the floor consists of a generally planar structural set of triangles both in the fixed and non-removable portion and in the rear removable portion of the floor, namely the base 2.

The rear oblique side members are part of the frame because they cooperate with it in order to absorb stresses transferred to the frame both by the suspension and by a possible impact against external objects.

Therefore, when the frame is sized by a computer, the rear oblique side members are considered as an integral part of the frame and not as simple additional elements supported by the frame.

Figure 13:
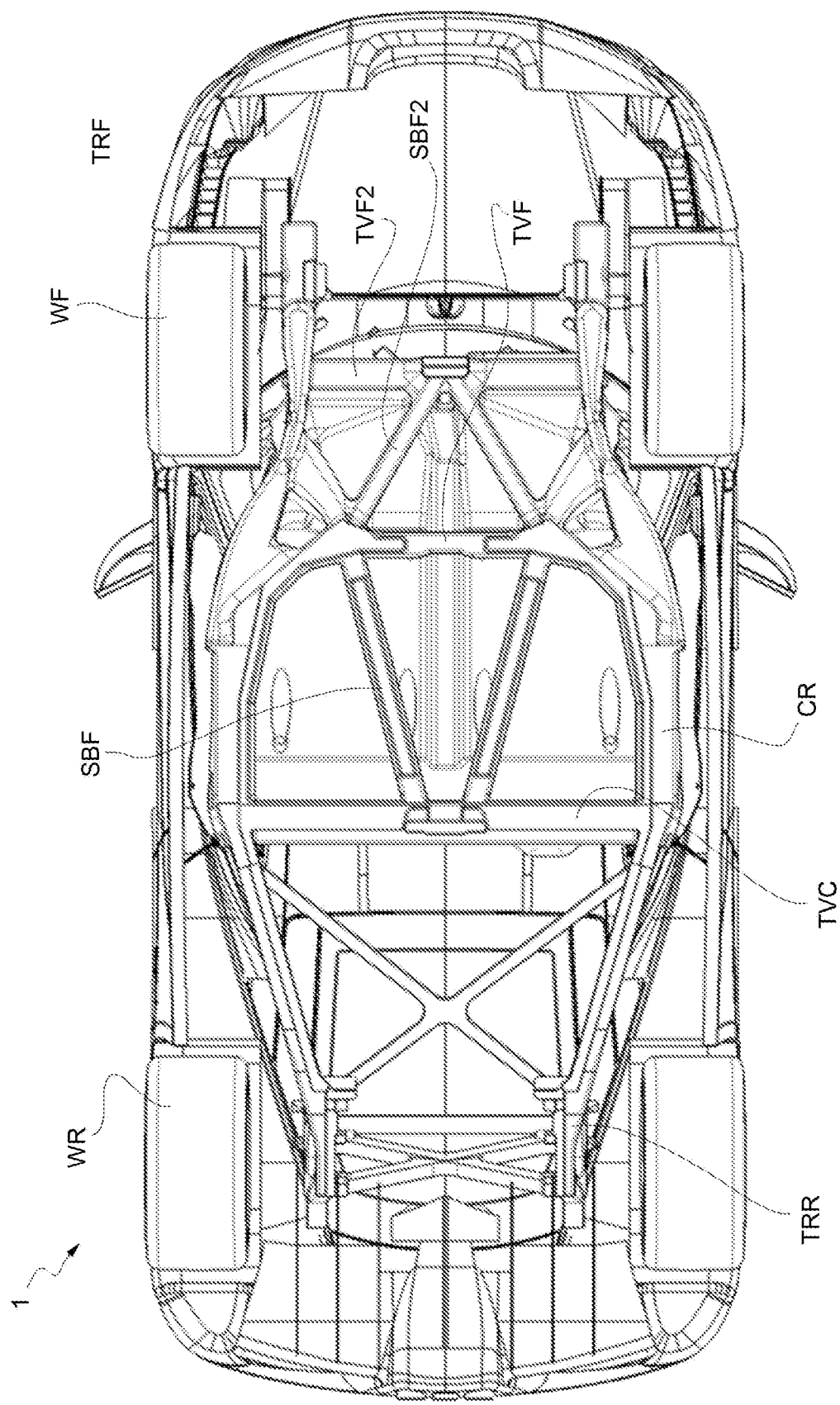
FIGS. 13 and 14 show two views from the bottom of the same car as the preceding figures with a removed floor and with a floor associated with the vehicle frame, respectively.

FIG. 13 shows a view from the bottom of the electric motor vehicle 1. It evidently is, with the comparison with FIG. 1, a sports car, since it is low relative to the respective longitudinal and transverse development.

In this case, the cabin is particularly elongated. Therefore, there can be a forward extension of the floor, which involves a further front beams TVF2.

The middle line of said further front beam TVF2 is interconnected to the front beam TVF by means of further oblique side members SBF2, which start from said middle line in order to be connected to the front beam TVF approximately in the points of connection of the front oblique side members SBF.

Said further front beam TVF2 is connected, at the opposite ends, to the front towers TRF supporting the front suspensions.

As to the portion of the frame at the back relative to the cabin C, the cradle CR closes in the area of the central beam TVC with intermediate towers TVM arranged on both sides of the vehicle.

These towers not only help stiffen the cabin, but also support further structural elements.

In particular, the upper part of the intermediate towers is interconnected to an upper central beam TVCS, which is parallel to the central beam TVC and is evidently arranged above the plane of the floor FL.

A truss structure is created between the intermediate towers TRM and the rear towers TRR, to which the rear suspensions of the vehicle are fixed, said truss structure always being a structural set of triangles, hereinafter referred to as staging CST.

Said truss structure has, in plan view, the shape of a quadrilateral and, in the space, it has the shape of a possibly right prism so as to simplify the operations for the connection of the base 2 to the remaining vehicle frame.

Therefore, there are an open lower base and an upper base, in which two diagonals joining the intermediate towers to one another are arranged.

Hence, the floor FL and, in general, the entire vehicle frame are highly rigid and safe.

The non-limiting example described above can be subjected to variations, without for this reason going beyond the scope of protection of the invention, comprising all embodiments that, for a person skilled in the art, are equivalent to the content of the claims.

When reading the description above, a skilled person can carry out the subject-matter of the invention without introducing further manufacturing details.

The invention claimed is:

1. A car (1) comprising
   a battery pack (BT2) including a pair of side members (SBR) forming a removable portion of a vehicular frame (F), wherein said pair of side members (SBR) can be removed from the vehicular frame (F) only together with the battery pack;
   the car (1) comprising a non-removable portion of the vehicular frame housed in the floor (FL) including a front beam (TVF) that transversely extends from one side of the sports car to the other side between a guide seat (S) and control pedals, and a central beam (TVC) that transversely extends from one side of the vehicle to the other side arranged immediately behind or below the seat (S), wherein between said front beam (TVF) and said central beam (TVC) there is longitudinally arranged a pair of front oblique side members (SBF) that converge towards a central area (CTRN) of the central beam (TFC) and diverge until intersecting said front beam (TVF), and wherein said pair of side members (SBR) included in said battery pack (BT2) are arranged behind said central beam (TVC).

2. The car according to claim 1, wherein said structural element (SBR) is enclosed in a sandwich like manner between a support frame (TS) that supports one or more battery modules and a platform (L2) that contributes to defining a base (2) of the car.

3. The car according to claim 1, wherein the non-removable portion of said vehicular frame (F) comprises a structural set of mutually complementary triangles (TVC, TVF, SBF, CR) and wherein said pair of side members (SBR) is arranged in an oblique manner with respect to a longitudinal development (Z) of the car for defining said structural set of triangles.

4. The car according to claim 1, wherein said pair of side members (SBR) meet in said central area (CTRN) of the central beam (TFC) and diverge proceeding backwards from the vehicle.

5. The car according to claim 1, wherein said frame (F) comprises a cradle (CR) that laterally surrounds the floor (FL) and wherein said front beam and said central beam intersect the cradle (CR) at their opposite ends.

6. The car according to claim 1, wherein said floor comprises a base (2), that defines a removable portion of the floor (FL) made integral with said rear battery pack (BT2).

7. The car according to claim 1, wherein in said floor, a right-prism shaped front battery pack (BT1) having a base that is complementary with each triangle of said structural sets is housed.

8. The car according to claim 7, wherein said front battery pack (BT1) comprises a plurality of cylindrical batteries having a rotational axis perpendicular to a plane of said floor, so as to occupy the entire space available inside at least a triangular structure.

\* \* \* \* \*